United States Patent
Kajiwara

(10) Patent No.: US 8,795,914 B2
(45) Date of Patent: Aug. 5, 2014

(54) FUEL CELL SYSTEM

(75) Inventor: Shigeto Kajiwara, Okazaki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 664 days.

(21) Appl. No.: 12/443,006

(22) PCT Filed: Oct. 16, 2007

(86) PCT No.: PCT/JP2007/070508
§ 371 (c)(1),
(2), (4) Date: Mar. 26, 2009

(87) PCT Pub. No.: WO2008/047932
PCT Pub. Date: Apr. 24, 2008

(65) Prior Publication Data
US 2010/0028738 A1  Feb. 4, 2010

(30) Foreign Application Priority Data
Oct. 18, 2006  (JP) .................. 2006-284163

(51) Int. Cl.
*H01M 8/04* (2006.01)
(52) U.S. Cl.
USPC ............ 429/429; 429/414; 429/428; 429/443
(58) Field of Classification Search
CPC .............. H01M 8/04; H01M 8/04082; H01M 8/04156; H01M 8/04179; H01M 8/04223; H01M 8/04298; H01M 8/04492
USPC .................. 429/414, 428, 429, 443
See application file for complete search history.

(56) References Cited

U.S. PATENT DOCUMENTS

| | | | |
|---|---|---|---|
| 6,524,733 B1* | 2/2003 | Nonobe ..................... | 429/413 |
| 2004/0219401 A1* | 11/2004 | Hobmeyr et al. ............. | 429/13 |
| 2005/0153176 A1* | 7/2005 | Forte et al. .................. | 429/17 |
| 2005/0199192 A1* | 9/2005 | Goebel et al. .............. | 123/41.01 |
| 2006/0008692 A1* | 1/2006 | Sawa ........................... | 429/33 |
| 2006/0083965 A1* | 4/2006 | Rainville et al. ............. | 429/22 |

(Continued)

FOREIGN PATENT DOCUMENTS

| CN | 1793882 | * 6/2006 | ............. G01N 27/12 |
|---|---|---|---|
| DE | 103 14 820 A1 | 12/2004 | |

(Continued)

OTHER PUBLICATIONS

Federal Register, vol. 76, No. 27, Feb. 9, 2011, pp. 7162-7175, "Supplementary Examination Guidelines for Determining Compliance with 35 U.S.C. 112 and for Treatment of Related Issues in Patent Applications," United States Patent and Trademark Office, Commerce.*

*Primary Examiner* — Ula C Ruddock
*Assistant Examiner* — Amanda Barrow
(74) *Attorney, Agent, or Firm* — Kenyon & Kenyon LLP

(57) ABSTRACT

A fuel cell system includes a fuel cell stack for receiving a supplied reactant gas to generate a power; an air compressor for removing moisture remaining in the fuel cell stack during the stop of the power generation; a secondary cell for supplying an operative power to the air compressor; and a controller for controlling the balance of water flowing into and out of the fuel cell stack so that a time required to remove the moisture remaining in the fuel cell stack by the air compressor is substantially constant.

4 Claims, 4 Drawing Sheets

(56) References Cited

U.S. PATENT DOCUMENTS

| | | |
|---|---|---|
| 2006/0105206 A1* | 5/2006 | Aoyagi et al. ............... 429/12 |
| 2006/0115699 A1* | 6/2006 | Matsuoka ..................... 429/24 |
| 2006/0172162 A1* | 8/2006 | Pearson ........................ 429/22 |
| 2008/0014476 A1* | 1/2008 | Kratschmar et al. .......... 429/13 |
| 2008/0075986 A1* | 3/2008 | Salvador et al. .............. 429/13 |
| 2009/0023040 A1* | 1/2009 | Paik et al. ..................... 429/34 |

FOREIGN PATENT DOCUMENTS

| | | |
|---|---|---|
| DE | 10 2005 049 846 A1 | 4/2006 |
| EP | 1 400 548 A1 | 3/2004 |
| JP | 2003-297399 A | 10/2003 |
| JP | 2004-22460 A | 1/2004 |
| JP | 2004-71307 A | 3/2004 |
| JP | 2004-192852 A | 7/2004 |
| JP | 2005-44532 A | 2/2005 |
| JP | 2005-141943 A | 6/2005 |
| JP | 2005-302708 A | 10/2005 |
| JP | 2006-4904 A | 1/2006 |
| JP | 2006-139924 A | 6/2006 |
| JP | 2006-147313 A | 6/2006 |

\* cited by examiner

FUEL CELL SYSTEM

This is a 371 national phase application of PCT/JP2007/070508 filed 16 Oct. 2007, which claims priority to Japanese Patent Application No. 2006-284163 filed 18 Oct. 2006, the contents of which are incorporated herein by reference.

TECHNICAL FIELD

The present invention relates to a fuel cell system for supplying a removal gas to a fuel cell stack during the stop of power generation, to discharge moisture from the fuel cell stack.

BACKGROUND ART

In recent years, as one sphere of approaches to environmental problems, the development of low-emission vehicles has been progressed, and one of the vehicles is a fuel cell vehicle including a fuel cell system as a car-mounted power source. The fuel cell system is an energy conversion system for supplying a reactant gas to a membrane-electrode assembly to cause an electrochemical reaction, thereby converting chemical energy into electric energy. In each assembly, an anode pole is arranged on one face of an electrolytic film, and a cathode pole is arranged on the other face thereof. Above all, a solid polymer electrolyte type fuel cell system in which a solid polymer film is used as an electrolyte can easily be made compact at a low cost, and additionally it has a high output density. In consequence, the use application of the system as the car-mounted power source is expected.

In a gas channel of a fuel cell stack, formed water generated by the electrochemical reaction of the reactant gas, humidification water for humidifying the reactant gas and the like remain. If the power generation is stopped while leaving this remaining water, the remaining water freezes in an environment at a low temperature, the diffusion of the reactant gas to the membrane-electrode assembly is prevented, and low-temperature starting properties lower.

In view of such a problem, heretofore, when the power generation is stopped, removal processing is performed to drive an air compressor by the power of an accumulator device, thereby discharging moisture remaining in the gas channel of the fuel cell stack. In Japanese Patent Application Laid-Open No. 2003-297399, a method is suggested which estimates the amount of the water remaining in the fuel cell stack to increase a removal time, as the amount of the remaining water is large.

[Patent Document 1] Japanese Patent Application Laid-Open No. 2003-297399

DISCLOSURE OF THE INVENTION

However, the amount of water remaining in a fuel cell stack noticeably varies in accordance with an operation output, temperature, humidity or the like. Therefore, by a method disclosed in Japanese Patent Application Laid-Open No. 2003-297399, a time required for removal has to be regulated in accordance with the amount of the remaining water every time, and hence removal control becomes complicated.

Consequently, to solve the above problem, the theme of the present invention is to suggest a fuel cell system capable of simplifying the removal control.

To achieve the above theme, a fuel cell system according to the present invention comprises: a fuel cell stack which receives a supplied reactant gas to generate a power; a removal device which removes moisture remaining in the fuel cell stack during the stop of the power generation; an accumulator device which supplies an operative power to the removal device; and a water balance control device which controls the balance of water flowing into and out of the fuel cell stack so that a time required to remove the moisture remaining in the fuel cell stack by the removal device is substantially constant.

The balance of the water flowing into and out of the fuel cell stack (the balance calculation of the amount of formed water, the amount of carried-away water and the amount of humidification water) is controlled so that the time required to remove the moisture remaining in the fuel cell stack by the removal device is substantially constant, which can simplify the removal control.

BEST MODE FOR CARRYING OUT THE INVENTION

Figure 1:
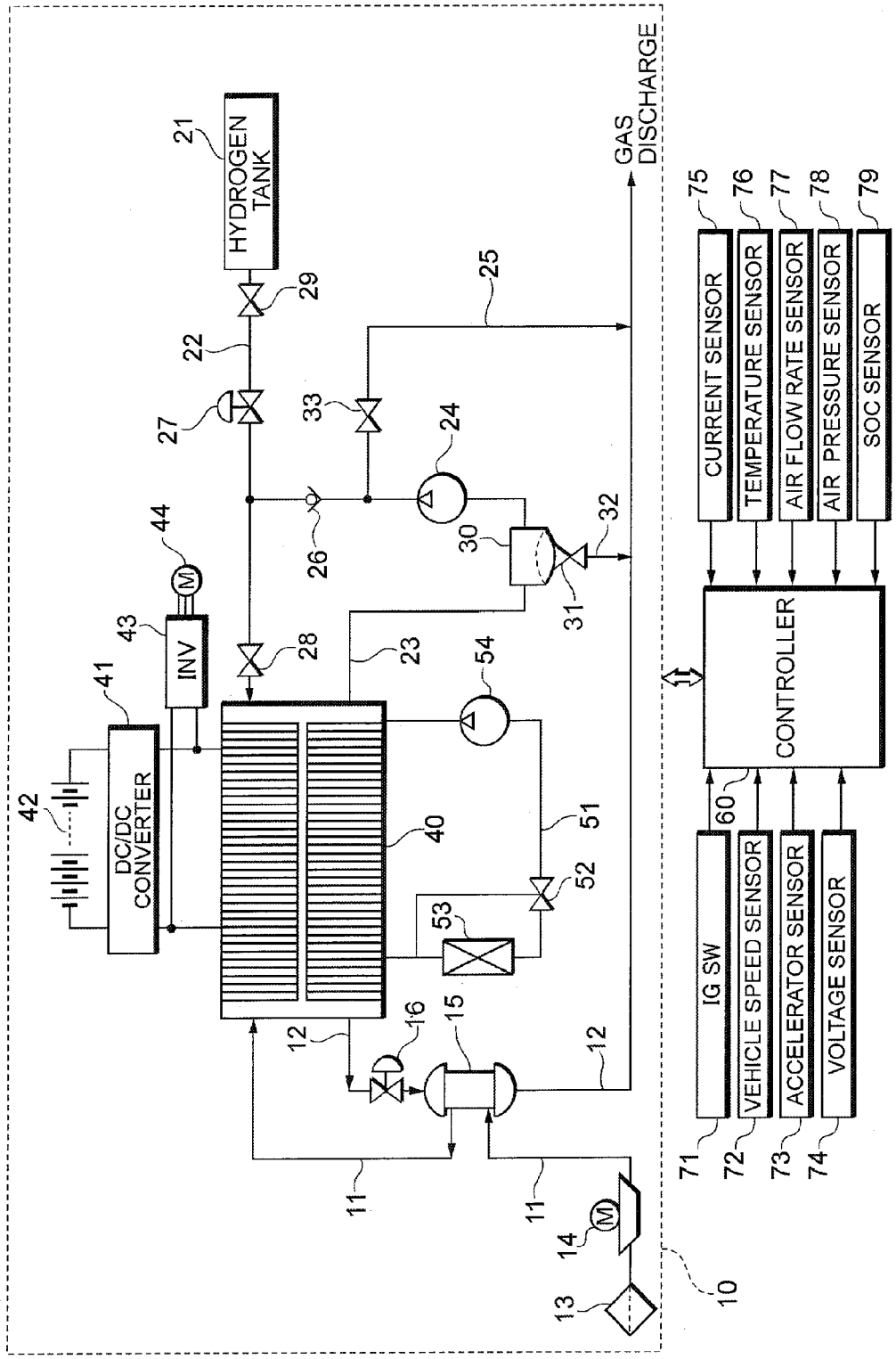
FIG. 1 is a system constitution diagram of a fuel cell system according to the present embodiment.

FIG. 1 shows a system constitution of a fuel cell system 10 according to the present embodiment.

The fuel cell system 10 functions as a car-mounted power generation system mounted on a fuel cell vehicle, and includes a solid polymer electrolyte type fuel cell stack 40 having a stack structure in which a plurality of cells are stacked. Each cell includes a membrane-electrode assembly in which an anode pole is arranged on one face of an electrolytic film, whereas a cathode pole is arranged on the other face, and a separator provided with gas channels (an anode gas channel, a cathode gas channel) for allowing reactant gases (a fuel gas, an oxidizing gas) to flow through the membrane-electrode assembly and a refrigerant passage for allowing a refrigerant to flow through the assembly. In the fuel cell stack 40, the anode pole receives a supplied hydrogen gas (the fuel gas), and the cathode pole receives a supplied oxygen gas (the oxidizing gas) to generate a power.

In the fuel cell stack 40, an oxidizing reaction of formula (1) occurs in the anode pole, and a reducing reaction of formula (2) occurs in the cathode pole. In the whole fuel cell stack 40, an electromotive reaction of formula (3) occurs.

$$H_2 \rightarrow 2H^+ + 2e^- \quad (1)$$

$$(½)O_2 + 2H^+ + 2e^- \rightarrow H_2O \quad (2)$$

$$H_2 + (½)O_2 \rightarrow H_2O \quad (3)$$

An oxygen gas supply system of the fuel cell system 10 is provided with an oxygen gas supply path 11 for supplying the oxygen gas to the fuel cell stack 40, and an oxygen off gas discharge path 12 for discharging an oxygen off gas from the fuel cell stack 40. The oxygen gas supply path 11 is provided with a filter 13 for removing powder dust and the like contained in the oxygen gas of the atmosphere, an air compressor 14 for pressurizing the oxygen gas, and a humidification module 15 for adequately humidifying the oxygen gas pressurized by the air compressor 14.

The humidification module 15 performs moisture exchange between the low wet oxygen gas (a dry gas) taken from the atmosphere and the high wet oxygen off gas (a wet gas) discharged from the cathode pole of the fuel cell stack 40. As shown in the formula (2), since the moisture is formed in the cathode pole, the oxygen off gas discharged from the cathode pole contains a large amount of moisture. The oxygen gas humidified by the humidification module 15 is supplied to the fuel cell stack 40 through the oxygen gas supply path 11, and used for the power generation of the fuel cell stack 40. The oxygen off gas discharge path 12 is a pipe provided in an oxygen gas discharge system, and between the humidification module 15 and the fuel cell stack 40 is arranged a pressure regulation valve 16 which regulates an oxygen gas pressure in the fuel cell stack 40. The oxygen off gas flowing through the oxygen off gas discharge path 12 passes through the pressure regulation valve 16, is used in the moisture exchange in the humidification module 15, and is discharged as an exhaust gas from the system to the atmosphere.

A hydrogen gas supply system of the fuel cell system 10 is provided with a hydrogen tank 21 as a hydrogen supply source in which the high-pressure hydrogen gas is received; a hydrogen gas supply path 22 for supplying, to the fuel cell stack 40, the hydrogen gas with which the hydrogen tank 21 is filled; a block valve 29 which controls the supply/stop of the hydrogen gas from the hydrogen tank 21 to the hydrogen gas supply path 22; a block valve 28 which controls the supply/stop of the hydrogen gas from the hydrogen gas supply path 22 to the fuel cell stack 40; a circulation path 23 for returning, to the hydrogen gas supply path 22, a hydrogen off gas (an unreacted hydrogen gas) discharged from the fuel cell stack 40; a hydrogen pump 24 which feeds under pressure, to the hydrogen gas supply path 22, the hydrogen off gas flowing through the circulation path 23; and a discharge path 25 branched from the circulation path 23 to join the oxygen off gas discharge path 12.

On the upstream side of the hydrogen gas supply path 22 is interposed a regulator 27 which regulates the pressure of the high-pressure hydrogen gas discharged from the hydrogen tank 21. The circulation path 23 joins the downstream side of the regulator 27. The hydrogen gas flowing from the hydrogen tank 21 to the hydrogen gas supply path 22 joins the hydrogen off gas reflowing through the circulation path 23 at a connection point between the hydrogen gas supply path 22 and the circulation path 23, and the gases are supplied as a mixed gas to the fuel cell stack 40. On the downstream side of the hydrogen pump 24 of the circulation path 23 is interposed a check valve 26 for suppressing the counter flow of the hydrogen off gas returning to the fuel cell stack 40.

On the upstream side of the hydrogen pump 24 is interposed a gas-liquid separator 30 for separating the moisture from the hydrogen off gas flowing through the circulation path 23. A fluid flowing through the circulation path 23 includes the hydrogen off gas discharged from the fuel cell stack 40, and formed water generated by an electrochemical reaction in the fuel cell stack 40. The gas-liquid separator 30 separates this formed water from the hydrogen off gas. The hydrogen off gas from which the moisture has been separated is returned to the fuel cell stack 40 by the hydrogen pump 24, whereas the moisture collected by the gas-liquid separator 30 is discharged from a fluid pipe 32 to the oxygen off gas discharge path 12 through a drain valve 31.

The upstream end of the fluid pipe 32 is connected to the drain valve 31 of the gas-liquid separator 30, and the downstream end thereof is connected to the oxygen off gas discharge path 12, thereby allowing the moisture separated by the gas-liquid separator 30 to flow into the oxygen off gas discharge path 12. The discharge path 25 is provided with a purge valve 33 which functions as a shut valve for opening/closing this path. When the purge valve 33 is appropriately opened/closed, impurities included in the hydrogen off gas can be discharged together with the hydrogen off gas to the oxygen off gas discharge path 12 through the discharge path 25. When the impurities included in the hydrogen off gas are discharged from the discharge path 25, the concentration of the impurities in the hydrogen off gas can be lowered, and the concentration of hydrogen in the hydrogen off gas to be circulated and supplied to the fuel cell stack 40 can be raised.

A power system of the fuel cell system 10 is provided with a secondary cell 42 as an accumulator device for accumulating the generated power of the fuel cell stack 40 or regenerative energy during the braking of the vehicle; a DC/DC converter 41 which regulates the output voltage of the fuel cell stack 40 to control the distribution of the power to be supplied to the fuel cell stack 40 and the secondary cell 42; and a traction inverter 43 which converts the direct-current power supplied from the fuel cell stack 40 or the secondary cell 42 into the alternate-current power to supply the power to a traction motor (a vehicle running motor) 44.

The secondary cell 42 is the accumulator device capable of accumulating and discharging the power, and functions as a regenerative energy storage source during brake regeneration and an energy buffer at a time when a load fluctuates accompanying the acceleration or deceleration of the fuel cell vehicle. As the secondary cell 42, for example, a nickel/cadmium accumulator battery, a nickel/hydrogen accumulator battery, a lithium secondary cell or the like is preferable. Instead of the secondary cell 42, an accumulator device such as a capacitor may be mounted.

A cooling system of the fuel cell system 10 is provided with a refrigerant passage 51 for allowing a refrigerant to circulate through the fuel cell stack 40; a refrigerant pump 54 for feeding the refrigerant under pressure through the refrigerant passage 51; a radiator 53 for cooling the refrigerant; and a bypass valve 52 for allowing the refrigerant to bypass the radiator 53 and flow through the refrigerant passage 51. When the bypass amount of the refrigerant bypassing the radiator 53 is adjusted, a refrigerant temperature can be regulated.

A control system of the fuel cell system 10 is provided with a controller 60 for controlling the whole fuel cell system 10. The controller 60 is a control unit (ECU) including a central processing unit (CPU), a storage device (ROM, RAM), an input/output interface and the like. The controller 60 monitors an operation state based on sensor outputs from various sensors to control the fuel cell system 10.

The sensors include an ignition switch 71 which outputs a start/stop signal; a vehicle speed sensor 72 which detects a vehicle speed; an accelerator sensor 73 which detects an accelerator open degree; a voltage sensor 74 which detects the output voltage of each cell constituting the fuel cell stack 40; a current sensor 75 which detects the output current (the FC current) of the fuel cell stack 40; a temperature sensor 76 which detects the temperature (the FC temperature) of the fuel cell stack 40; an air flow rate sensor 77 which detects the flow rate of air flowing out of a cathode outlet of the fuel cell stack 40; an air pressure sensor 78 which detects the pressure of the air flowing out of the cathode outlet of the fuel cell stack 40; a state of charge (SOC) sensor 79 which detects the SOC of the secondary cell 42 and the like.

For example, on receiving the start signal output from the ignition switch 71, the controller 60 starts the operation of the fuel cell system 10, and obtains the demanded power of the whole system based on an accelerator open degree signal output from the accelerator sensor 73, a vehicle speed signal output from the vehicle speed sensor 72 and the like. The demanded power of the whole system is a total value of a vehicle running power and an auxiliary device power. The auxiliary device power includes power to be consumed by car-mounted auxiliary devices (the humidifier, the air compressor, the hydrogen pump, a cooling water circulation pump, etc.); power to be consumed by devices (a change, gear, a wheel control device, a steering device, a suspension device, etc.) necessary for the vehicle running; power to be consumed by devices (an air conditioning device, a lighting fixture, an audio, etc.) arranged in a passenger space and the like.

Moreover, the controller 60 determines the distribution of the output power of the fuel cell stack 40 and the secondary cell 42, regulates the rotation number of the air compressor 14 or the valve open degree of the regulator 27 and the amount of the reactant gas to be supplied to the fuel cell stack 40 so that the amount of the power to be generated by the fuel cell stack 40 agrees with a target power, and controls the DC/DC converter 41 to regulate the output voltage of the fuel cell stack 40, thereby controlling the operation point (the output voltage, the output current) of the fuel cell stack 40. Furthermore, to obtain a target vehicle speed in accordance with the accelerator open degree, the controller 60 outputs, for example, the alternate-current voltage instruction values of a U-phase, a V-phase and a W-phase as switching instructions to the inverter 43, thereby controlling the output torque and the rotation number of the traction motor 44.

Figure 2:
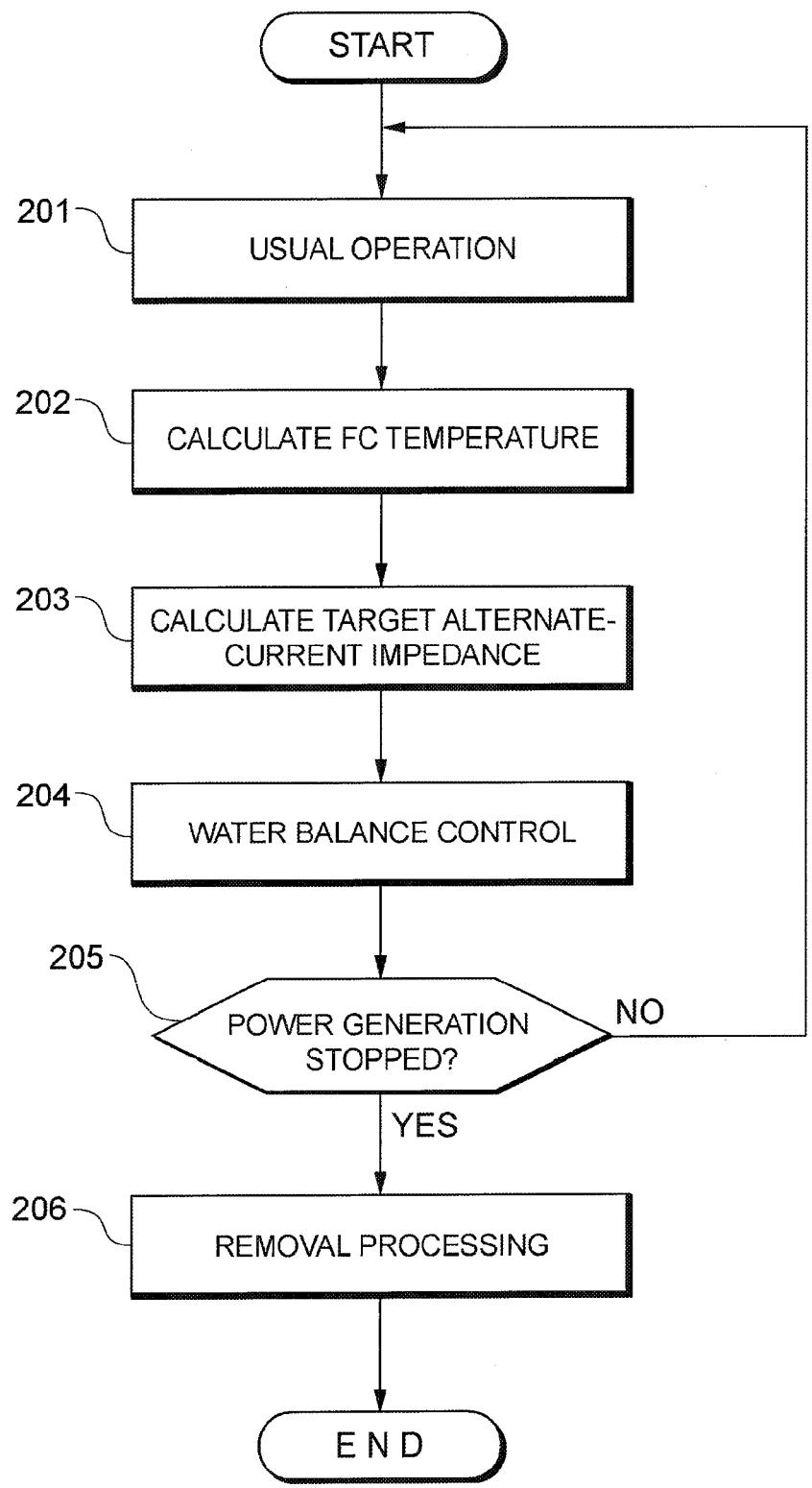
FIG. 2 is a flow chart showing water balance control for regulating a time required for removal processing to obtain a substantially constant time.

Next, water balance control for adjusting a time required for removal processing to a substantially constant time will generally be described with reference to FIG. 2.

On receiving the start signal output from the ignition switch 71, the controller 60 performs a usual operation (step 201). During the usual operation, the controller 60 obtains the demanded power of the whole system based on the accelerator open degree signal output from the accelerator sensor 73, the vehicle speed signal output from the vehicle speed sensor 72 and the like, determines the distribution of the output power of the fuel cell stack 40 and the secondary cell 42, and controls the auxiliary devices so that the amount of the power to be generated by the fuel cell stack 40 agrees with the target power.

The controller 60 takes the sensor output from the temperature sensor 76, and measures the temperature of the fuel cell stack 40 (step 202).

Moreover, the controller 60 calculates the target alternate-current impedance of the fuel cell stack 40 based on the FC temperature measured in the step 202 (step 203). A process to measure the target alternate-current impedance based on the FC temperature will be described later.

In addition, it is known that in a case where the response voltage of the fuel cell stack 40 when applying an alternate-current signal to the fuel cell stack 40 is E, a response current is I and an alternate-current impedance is Z, the following relation equations are established.

$$E = E_0 \exp j(\omega t + \Phi)$$

$$I = I_0 \exp j\omega t$$

$$Z = E/I = (E_0/I_0) \exp j\Phi = R + j\chi$$

wherein $E_0$ is the amplitude of the response voltage, $I_0$ is the amplitude of the response current, $\omega$ is an angular frequency, $\Phi$ is an initial phase, R is a resistance component (a real part), $\chi$ is a reactance component (an imaginary part), j is an imaginary unit, and t is a time.

The controller 60 controls the balance of the water flowing into and out of the fuel cell stack 40 so that the alternate-current impedance of the fuel cell stack 40 agrees with the target alternate-current impedance (step 204). The details of the water balance control will be described later.

The controller 60 controls the DC/DC converter 41 to superimpose the alternate-current signal on the fuel cell stack 40, and can detect the voltage response by the voltage sensor 74 to measure the alternate-current impedance. As another method for measuring the alternate-current impedance, the controller 60 may measure the alternate-current impedance of the fuel cell stack 40 by use of an internal resistance measuring instrument. The internal resistance measuring instrument is a high-frequency impedance measuring instrument capable of applying the high-frequency current to the fuel cell stack 40 and detecting the voltage response of the stack to obtain the alternate-current impedance of the fuel cell stack 40.

Then, the controller 60 judges whether or not there is a request for power generation stop (step 205). When the ignition switch 71 is switched off, the request for the power generation stop is output to the controller 60. As long as there is not any request for the power generation stop (the step 205; NO), the controller 60 executes the processing of the steps 201 to 204.

The temperature of the fuel cell stack 40 constantly fluctuates in accordance with the operation state, and hence the target alternate-current impedance also constantly fluctuates in accordance with the operation state. The controller 60 controls the balance of the water flowing into and out of the fuel cell stack 40 so as to follow the constantly fluctuating target alternate-current impedance.

On receiving the request for the power generation stop (the step 205; YES), the controller 60 drives the air compressor 14 by use of the power accumulated in the secondary cell 42, and supplies a removal gas to the gas channel in the fuel cell stack 40 to remove the moisture in the gas channel (step 206). The air compressor 14 functions as a removal device for removing the moisture in the fuel cell stack 40.

Figure 3:
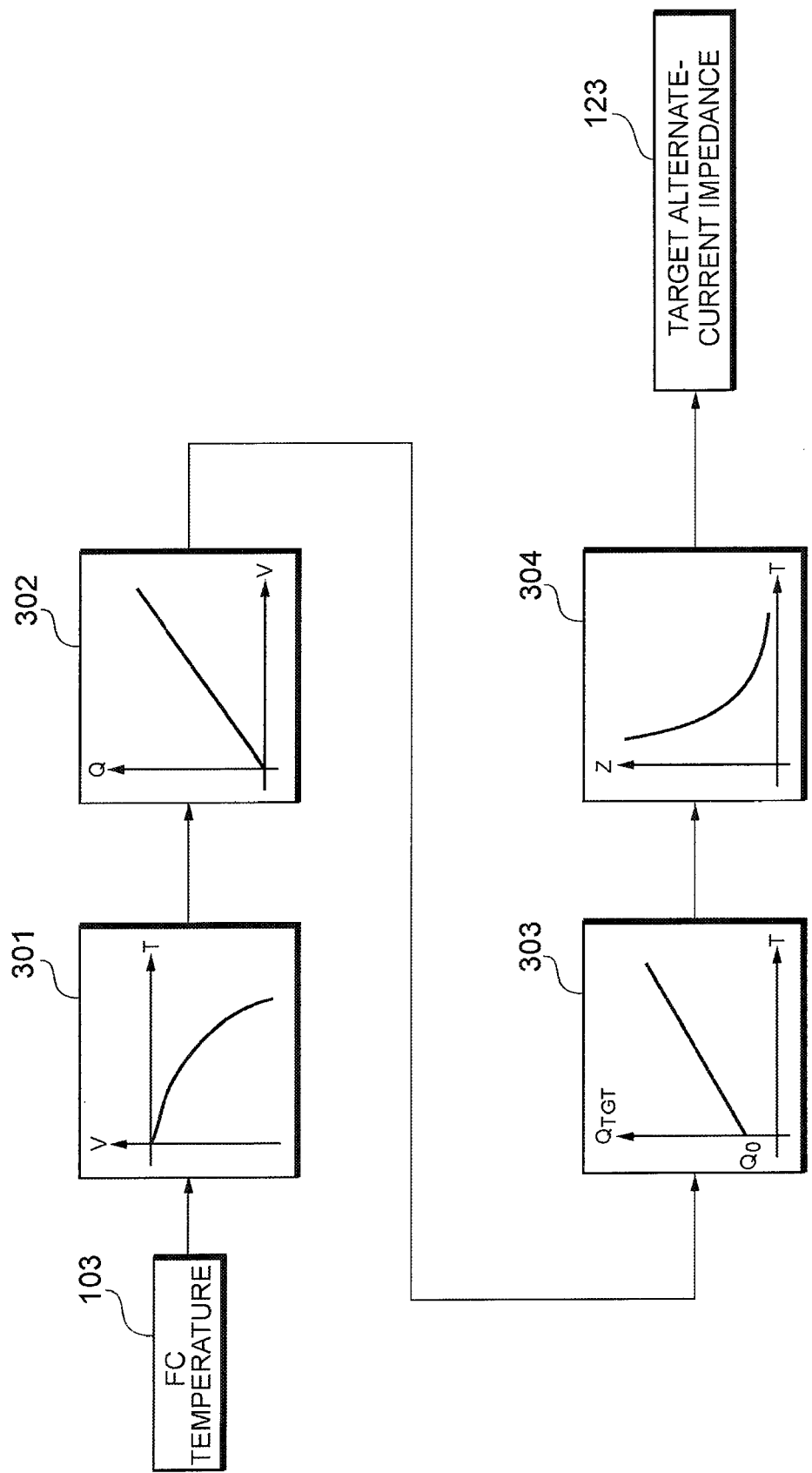
FIG. 3 is an explanatory view showing a calculation process of target alternate-current impedance.

Here, the process to calculate the target alternate-current impedance (the step 203) will be described in detail with reference to FIG. 3.

The controller 60 calculates a drying speed V corresponding to an FC temperature 103 based on the FC temperature 103 measured in the step 202 and temperature-drying speed map data (the T-V map data) 301. The temperature-drying speed map data 301 is map data in which the abscissa indicates the temperature, the ordinate indicates the drying speed (the amount of the moisture to be removed per unit time), and the drying speed corresponding to each temperature is plotted.

The controller 60 calculates a dry amount Q corresponding to the drying speed V based on the drying speed V and drying speed-dry amount map data (the V-Q map data) 302. The drying speed-dry amount map data 302 is map data in which the abscissa indicates the drying speed, the ordinate indicates the dry amount, and the dry amount corresponding to each drying speed is plotted. The dry amount Q is calculated by multiplying the drying speed V by a removal time $\Delta tT$.

The controller 60 calculates a target water amount QTGT corresponding to the temperature 103 based on the temperature 103 and temperature-target water amount map data (the T-QTGT map data) 303. The temperature-target water amount map data 303 is map data in which the abscissa indicates the temperature, the ordinate indicates the target water amount, and the target water amount corresponding to each temperature is plotted. The target water amount QTGT is obtained by adding up the dry amount Q and remaining water amount QEND. Here, the dry amount Q is the amount of the moisture to be discharged from the fuel cell stack 40 during the removal processing, and the remaining water amount QEND is the amount of the moisture remaining in the fuel cell stack 40 after the removal processing.

The controller 60 calculates a target alternate-current impedance 123 corresponding to the temperature 103 based on the temperature 103 and temperature-target alternate-current impedance map data (the T-Z map data) 304. The temperature-target alternate-current impedance map data 304 is map data in which the abscissa indicates the temperature, the ordinate indicates the target alternate-current impedance, and the target alternate-current impedance corresponding to each temperature is plotted. It is known that there is a correlation between the alternate-current impedance and the target water amount QTGT, and hence the target alternate-current impedance can be obtained from the target water amount QTGT.

It is to be noted that for the sake of the convenience of explanation, there has been described the process to calculate the target alternate-current impedance 123 by use of the temperature-drying speed map data 301, the drying speed-dry amount map data 302, the temperature-target water amount map data 303 and the temperature-target alternate-current impedance map data 304. However, the temperature-drying speed map data 301, the drying speed-dry amount map data 302 and the temperature-target water amount map data 303 are physical models for theoretically deriving the temperature-target alternate-current impedance map data 304. Therefore, the temperature-target alternate-current impedance map data 304 suffices an actual operation.

Figure 4:
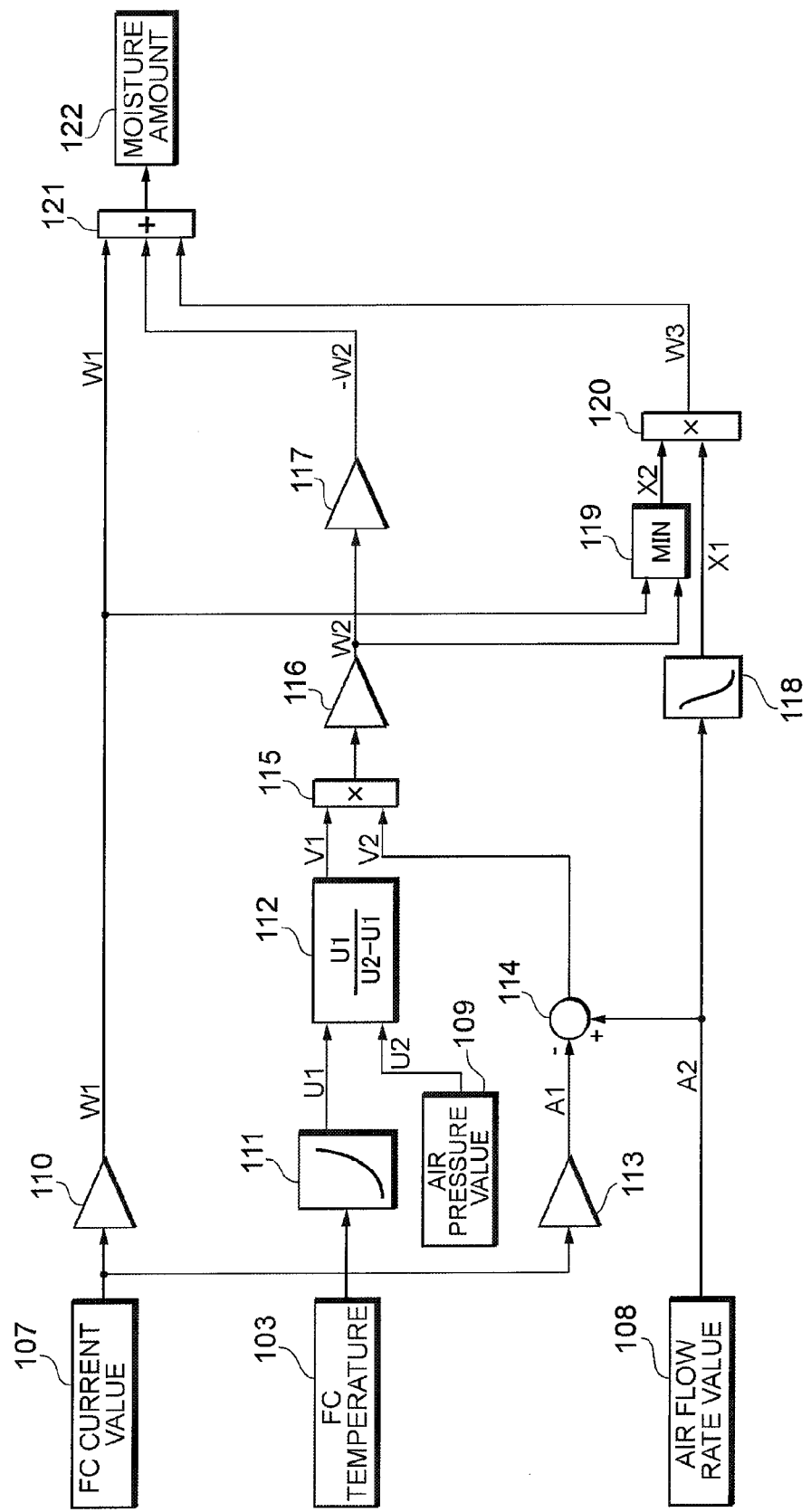
FIG. 4 is an explanatory view showing a control process of water balance.

Here, a process (the step 204) to control the balance of the water flowing into and out of the fuel cell stack 40 will be described in detail with reference to FIG. 4.

The controller 60 multiplies an FC current value 107 measured from the output value of the current sensor 75 by a gain 110 to calculate a formed water amount W1 [g/sec]. The gain 110 is a constant having a value of the number of the cells/LVFF/2×18, and LVFF is Faraday constant (96500 C/mol). Furthermore, the controller 60 calculates a vapor pressure U1 from the FC temperature 103 measured from the output value of the temperature sensor 76 and water saturation vapor characteristic map data 111, and measures an air pressure value 109 (hereinafter referred to as the air pressure value U2) from the output value of the air pressure sensor 78. Then, the controller 60 substitutes the arguments U1, U2 into a function 112 to calculate a partial pressure ratio V1 between the vapor and the air.

The controller 60 multiplies the FC current value 107 measured from the output value of the current sensor 75 by a gain 113 to calculate the amount A1 [mol/sec] of the consumed air. The gain 113 is a constant having a value of the number of the cells/LVFF/4. The controller 60 measures an air flow rate value 108 (hereinafter referred to as an air flow rate value A2 [mol/sec]) at a cathode outlet from the output value of the air flow rate sensor 77. Then, the controller 60 calculates an air flow rate V2 converted into carried-away moisture by the air flow rate A2–the amount A1 of the consumed air. The controller 60 substitutes the arguments V1, V2 into a multiplication function 115, and multiplies the resultant return value by a gain 116 to calculate the amount W2 [g/sec] of the carried-away water. The gain 116 is a constant having a value of 18. The amount W2 of the carried-away water is multiplied by a gain 117 having a value of –1, to have a sign –.

The controller 60 calculates a vapor replacement ratio X1 corresponding to the air flow rate A2 based on humidification module vapor replacement ratio map data 118. The controller 60 substitutes the arguments W1, W2 into an MIN function 119 to obtain the resultant return value X2. The MIN function 119 is a function for obtaining, as the return value, an argument having a minimum value among a plurality of arguments. The controller 60 substitutes the arguments W1, W2 into a multiplication function 120 to obtain the amount W3 [g/sec] of the humidification water as a return value. The controller 60 substitutes the arguments W1, –W2 and W3 into an addition function 121 to obtain the amount 122 of the moisture remaining in the fuel cell stack 40 as a return value.

The controller 60 controls the amount W1 of the formed water, the amount W2 of the carried-away water and the amount W3 of the humidification water so that the amount 122 of the moisture agrees with the target water amount QTGT. Specifically, when the amount 122 of the moisture is smaller than the target water amount QTGT, the controller 60 performs an operation of increasing the FC current value 107 or increasing the humidifying amount of the humidification module 15 or the like to increase the amount W1 of the formed water or the amount W3 of the humidification water. On the other hand, when the amount 122 of the moisture is larger than the target water amount QTGT, the controller 60 performs an operation of increasing the air flow rate value 108 or decreasing the air pressure value 109 or the like to increase the amount W2 of the carried-away water.

According to the present embodiment, the balance of the water flowing into and out of the fuel cell stack 40 (the balance calculation of the amount of the formed water, the amount of the carried-away water and the amount of the humidification water) is controlled so that the time required to remove the moisture remaining in the fuel cell stack 40 by the air compressor 14 is substantially constant, whereby the removal control can be simplified.

It is to be noted that the controller 60 functions as a water balance control device (the step 204) which controls the balance of the water flowing into and out of the fuel cell stack 40 so that the time required to remove the moisture remaining in the fuel cell stack 40 by the air compressor 14 is substantially constant.

INDUSTRIAL APPLICABILITY

According to the present invention, a removal time is substantially constant, and hence removal control can be simplified.

The invention claimed is:
1. A fuel cell system comprising:
a fuel cell stack configured to receive a supplied reactant gas to generate power;
a removal device configured to remove moisture from the fuel cell stack during the stop of the power generation;
an accumulator device configured to supply an operative power to the removal device; and
a water balance control device programmed to control the balance of water flowing into and out of the fuel cell stack so that a time required to remove the moisture from the fuel cell stack by the removal device is substantially constant.

2. The fuel cell system according to claim 1, wherein the water balance control device is programmed to calculate a target alternate-current impedance based on the temperature of the fuel cell stack, and is programmed to control the balance of the water flowing into and out of the fuel cell stack so that the alternate-current impedance of the fuel cell stack during the stop of the power generation is equal to the target alternate-current impedance.

3. The fuel cell system according to claim 2, wherein the water balance control device is programmed to control the power generation current of the fuel cell stack to control the water balance.

4. The fuel cell system according to claim 2, wherein the water balance control device is programmed to control the amount of the humidification water added to the fuel cell stack to control the water balance.

* * * * *